United States Patent
Tomita et al.

(10) Patent No.: US 11,514,945 B2
(45) Date of Patent: Nov. 29, 2022

(54) LUBRICANT FOR MAGNETIC RECORDING MEDIUM, AND METHOD FOR PRODUCING MAGNETIC RECORDING MEDIUM

(71) Applicant: SHOWA DENKO K.K., Tokyo (JP)

(72) Inventors: Hiroyuki Tomita, Ichihara (JP); Hiroko Hattori, Tokyo (JP); Naoya Fukumoto, Ichihara (JP); Ryuuta Miyasaka, Funabashi (JP); Naoko Ito, Tokorozawa (JP); Ichiro Ota, Chiba (JP); Katsumi Murofushi, Ichihara (JP)

(73) Assignee: SHOWA DENKO K.K., Tokyo (JP)

( * ) Notice: Subject to any disclaimer, the term of this patent is extended or adjusted under 35 U.S.C. 154(b) by 412 days.

(21) Appl. No.: 16/489,919

(22) PCT Filed: Feb. 20, 2018

(86) PCT No.: PCT/JP2018/005913
§ 371 (c)(1),
(2) Date: Aug. 29, 2019

(87) PCT Pub. No.: WO2018/159378
PCT Pub. Date: Sep. 7, 2018

(65) Prior Publication Data
US 2020/0005824 A1    Jan. 2, 2020

(30) Foreign Application Priority Data

Mar. 2, 2017   (JP) ............................. JP2017-039817

(51) Int. Cl.
*G11B 5/84*   (2006.01)
*G11B 5/72*   (2006.01)
(Continued)

(52) U.S. Cl.
CPC .......... *G11B 5/8408* (2013.01); *C08G 65/332* (2013.01); *C08G 65/333* (2013.01); *C10M 107/38* (2013.01); *G11B 5/7257* (2020.08)

(58) Field of Classification Search
CPC .... G11B 5/8408; G11B 5/725; C08G 65/332; C08G 65/333; C10M 107/38
(Continued)

(56) References Cited

U.S. PATENT DOCUMENTS 4,671,999 A * 6/1987 Burguette ........... C08F 299/024
                                                 428/835.8
2007/0102021 A1   5/2007 Nappa et al.

FOREIGN PATENT DOCUMENTS

CN   102314890 A   1/2012
CN   106883410 A   6/2017
(Continued)

OTHER PUBLICATIONS

H. Tani et al., "Molecular Conformation of Perfluoropolyether Lubricant Film on Magnetic Disks by Ultraviolet Irradiation," Intermag, EU-09, 2011, pp. 1-4.
(Continued)

*Primary Examiner* — Ling Siu Choi
*Assistant Examiner* — Ronald Grinsted
(74) *Attorney, Agent, or Firm* — Sughrue Mion, PLLC

(57) ABSTRACT

A lubricant for a magnetic recording medium capable of forming a lubricant layer having excellent adhesion to a protective layer is provided. A lubricant for a magnetic recording medium contains a fluorine-containing ether compound in which a group having an ethylenic carbon-carbon double bond is disposed at one or both terminals of a perfluoroalkyl polyether chain. It is preferable that the group having the ethylenic carbon-carbon double bond is disposed at one terminal of the perfluoroalkyl polyether chain, and a
(Continued)

hydroxyl group is disposed at other terminal. It is preferable that the lubricant for a magnetic recording medium contains a compound in which one or more functional groups selected from a hydroxyl group, an amino group, an amido group and a carboxyl group is disposed at one or both terminals of a perfluoroalkyl polyether chain.

11 Claims, 1 Drawing Sheet

(51) Int. Cl.
    *C08G 65/332*     (2006.01)
    *C08G 65/333*     (2006.01)
    *C10M 107/38*     (2006.01)
    *G11B 5/725*     (2006.01)
(58) Field of Classification Search
    USPC ........................................................ 427/508
    See application file for complete search history.

(56) References Cited

FOREIGN PATENT DOCUMENTS

| JP | 07-138359 A | 5/1995 |
|---|---|---|
| JP | 08-301837 A | 11/1996 |
| JP | 2001-131372 A | 5/2001 |
| JP | 2003-055310 A | 2/2003 |
| JP | 2003-335967 A | 11/2003 |
| JP | 2004-300369 A | 10/2004 |
| JP | 3888653 B2 | 3/2007 |
| JP | 2009-513348 A | 4/2009 |

OTHER PUBLICATIONS

International Search Report of PCT/JP2018/005913 dated May 29, 2018.
Office Action dated Jul. 21, 2020 in Chinese Application No. 201880012537.6.

\* cited by examiner

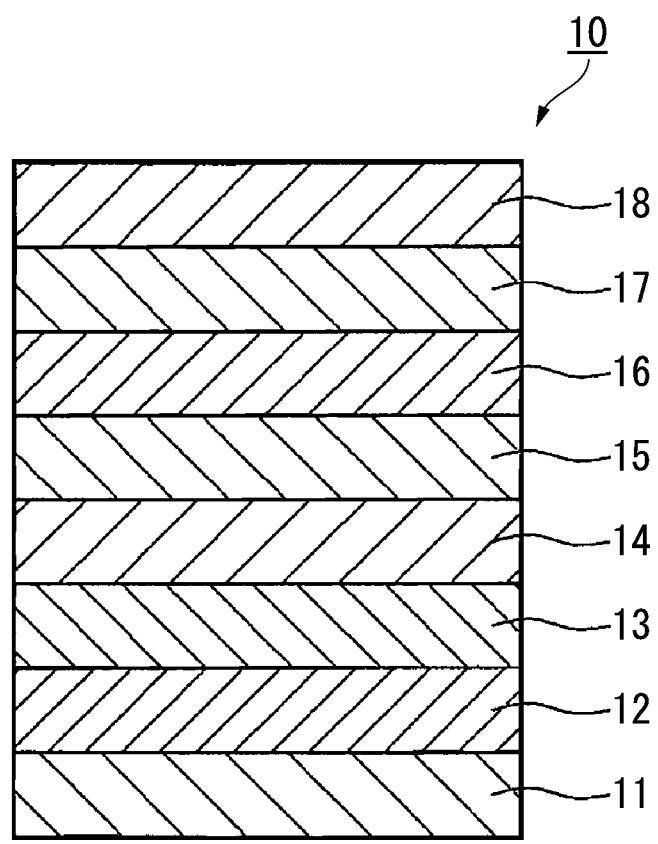

LUBRICANT FOR MAGNETIC RECORDING MEDIUM, AND METHOD FOR PRODUCING MAGNETIC RECORDING MEDIUM

CROSS REFERENCE TO RELATED APPLICATIONS

This application is a National Stage of International Application No. PCT/JP2018/005913 filed Feb. 20, 2018, claiming priority based on Japanese Patent Application No. 2017-039817 filed Mar. 2, 2017, the contents of which are incorporated herein by reference.

BACKGROUND OF THE INVENTION

Field of the Invention

The present invention relates to a lubricant for a magnetic recording medium and a method of producing a magnetic recording medium.

Description of Related Art

In order to improve recording density of a magnetic recording and reproducing apparatus, development of a magnetic recording medium suitable for high recording density is in progress.

Conventionally, as the magnetic recording medium, there is a magnetic recording medium in which a recording layer (magnetic layer) is formed on a substrate, and a protective layer made of carbon and the like is formed on the recording layer. The protective layer protects the information recorded in the recording layer and enhances wear resistance with contact of the magnetic head. However, durability of the magnetic recording medium cannot be sufficiently obtained only by providing the protective layer on the recording layer. Therefore, a lubricant is generally applied to the surface of the protective layer to form a lubricant layer.

As a lubricant for forming a lubricant layer of a magnetic recording medium, for example, a urea compound and a urethane compound having a perfluoroalkyl polyether chain were proposed (for example, Patent Document 1 and Patent Document 2).

Further, Patent Document 3 describes a coating agent for an optical fiber using a resin composition containing a urethane methacrylate obtained by reacting a fluorine-containing isocyanate and 2-isocyanate ethyl methacrylate.

Non-Patent Document 1 describes a magnetic recording medium in which a lubricant layer is formed using a lubricant having a perfluoropolyether chain in which a terminal of the molecule is a hydroxyl group or a trifluoromethyl group. In addition, Non-Patent Document 1 describes that by irradiating such a magnetic recording medium with ultraviolet light, surface energy of the magnetic recording medium decreases and film thickness of the lubricant layer bonded to the surface of the magnetic recording medium increases.

PATENT LITERATURE

[Patent Document 1] Japanese Unexamined Patent Application, First Publication No. H8-301837
[Patent Document 2] Japanese Unexamined Patent Application, First Publication No. H7-138359
[Patent Document 3] Japanese Patent Publication No. 3888653

Non-Patent Literature

[Non-Patent Document 1] H. Tani et al, INTERMAG 2011, EU-09

SUMMARY OF THE INVENTION

However, regarding the lubricant layer of the magnetic recording medium, in order to improve the durability of the magnetic recording medium, it has been necessary to further improve the adhesion between the lubricant layer and the protective layer.

The present invention has been made in view of the above circumstances, and an object of the present invention is to provide a lubricant for a magnetic recording medium capable of forming a lubricant layer having excellent adhesion to a protective layer.

Another object of the present invention is to provide a method of producing a magnetic recording medium, in which a lubricant layer having excellent adhesion to a protective layer is formed using the lubricant for a magnetic recording medium of the present invention.

The present inventors have studied intensively to solve the above-mentioned problems.

As a result, it was found that a lubricant for a magnetic recording medium comprising a fluorine-containing ether compound in which a group having an ethylenic carbon-carbon double bond is disposed at one or both terminals of a perfluoroalkyl polyether chain, may be used.

A lubricant layer which is formed by applying the above-mentioned lubricant for magnetic recording media onto the protective layer of the magnetic recording media, and then reacting the ethylenic carbon-carbon double bond by performing irradiation with ultraviolet rays, has excellent adhesion to the protective layer. The excellent adhesion between the lubricant layer and the protective layer is due to the fact that the fluorine-containing ether compound in the lubricant for a magnetic recording medium coated on the protective layer has an ethylenic carbon-carbon double bond at the terminal of the perfluoroalkyl polyether chain. It is presumed that the excellent adhesion is due to an effect of cleavage of the ethylenic carbon-carbon double bond disposed at the terminal of the perfluoroalkyl polyether chain by ultraviolet irradiation energy and bonding with the protective layer.

From the above examination results, the present invention shown below was completed.

[1] A lubricant for a magnetic recording medium, comprising a fluorine-containing ether compound in which a group having an ethylenic carbon-carbon double bond is disposed at one or both terminals of a perfluoroalkyl polyether chain.

[2] The lubricant for a magnetic recording medium according to [1], wherein the group having the ethylenic carbon-carbon double bond is disposed at one terminal of the perfluoroalkyl polyether chain and a hydroxyl group is disposed at the other terminal.

[3] The lubricant for a magnetic recording medium according to [1] or [2], wherein the group having an ethylenic carbon-carbon double bond is a (meth)acryloyl group.

[4] The lubricant for a magnetic recording medium according to [1] or [2], wherein the group having an ethylenic carbon-carbon double bond is a (meth)acryloyloxy group.

[5] A lubricant for a magnetic recording medium according to any one of [1] to [4], wherein the lubricant is represented by the following formula (3):

[Chemical formula 1]

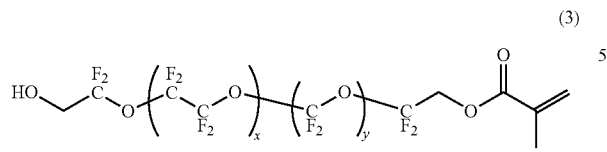
(3)

wherein x and y each represent an integer of 1 to 30.

[6] The lubricant for a magnetic recording medium according to any one of [1] to [4], wherein the lubricant is represented by the following formula (4):

[Chemical formula 2]

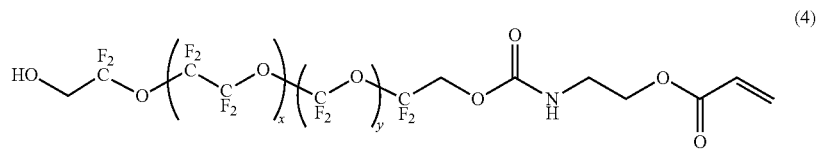
(4)

wherein x and y each represent an integer of 1 to 30.

[7] The lubricant for a magnetic recording medium according to any one of [1] to [4], wherein the lubricant is represented by the following formula (5):

[Chemical formula 3]

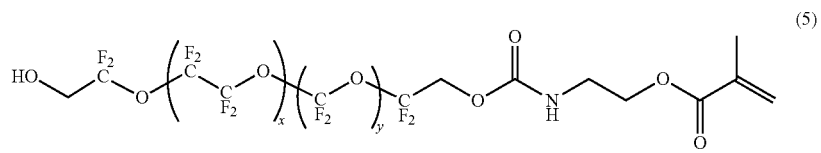
(5)

wherein x and y each represent an integer of 1 to 30.

[8] The lubricant for a magnetic recording medium according to any one of [1] to [4], wherein the lubricant is represented by the following formula (6):

[Chemical formula 4]

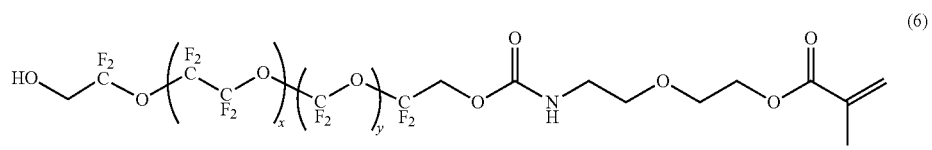
(6)

wherein x and y each represent an integer of 1 to 30.

[9] The lubricant for a magnetic recording medium according to any one of [1] to [4], wherein the lubricant is represented by the following formula (7):

[Chemical formula 5]

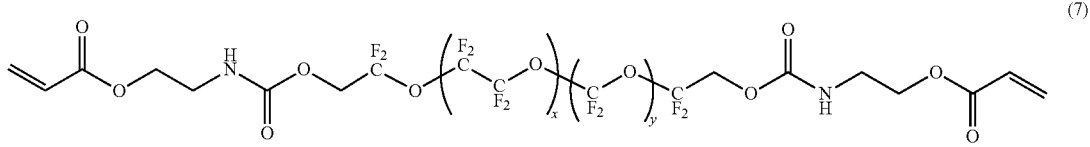

(7)

wherein x and y each represent an integer of 1 to 30.

[10] The lubricant for a magnetic recording medium according to any one of [1] to [9], further comprising a second compound in which one or more functional groups which are one or more types selected from the group consisting of a hydroxyl group, an amino group, an amido group and a carboxyl group are disposed at one or both terminals of a second perfluoroalkyl polyether chain.

[11] The lubricant for a magnetic recording medium according to any one of [1] to [10], wherein, in the fluorine-containing ether compound, the perfluoroalkyl polyether chain and the group having an ethylenic carbon-carbon double bond are bonded via a urethane bond.

[12] A method of producing a magnetic recording medium, comprising: a lubricant layer forming step of forming a lubricant layer on a protective layer, wherein the lubricant layer forming step comprises applying a solution for forming a lubricant layer on the protective layer wherein the solution contains the lubricant for a magnetic recording medium according to any one of [1] to [11], and then performing irradiation with ultraviolet rays.

The lubricant for a magnetic recording medium of the present invention comprises a fluorine-containing ether compound in which a group having an ethylenic carbon-carbon double bond is disposed at one or both terminals of a perfluoroalkyl polyether chain. Therefore, by applying a solution for forming a lubricant layer containing the lubricant for a magnetic recording medium on the protective layer and performing irradiation with ultraviolet rays, a lubricant layer for a magnetic recording medium having excellent adhesion to the protective layer can be obtained. Since the lubricant layer thus obtained reduces the friction between a magnetic head and the protective layer, the durability of the magnetic recording medium can be improved.

BRIEF DESCRIPTION OF THE DRAWINGS

FIG. 1 is a schematic cross-sectional view showing an embodiment of a magnetic recording medium manufactured by the method of producing a magnetic recording medium of the present invention.

DETAILED DESCRIPTION OF THE INVENTION

The method for producing a magnetic recording medium and the lubricant for a magnetic recording medium according to the present invention will be described in detail below, but the present invention is not limited to the embodiments described below.

[Lubricant for Magnetic Recording Media]

(First Embodiment)

A lubricant for a magnetic recording medium of the present embodiment (hereinafter sometimes abbreviated as "lubricant") contains a fluorine-containing ether compound.

"Fluorine-Containing Ether Compound"

The fluorine-containing ether compound used for the lubricant for a magnetic recording medium of the present embodiment is a compound having a group having an ethylenic carbon-carbon double bond disposed at one or both terminals of a perfluoroalkyl polyether chain.

The perfluoroalkyl polyether chain is preferably a perfluoroalkyl polyether chain represented by the following general formula (1).

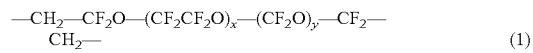

(1)

In the formula (1), x represents an integer of 1 to 30 and y represents an integer of 0 to 30. There is no particular limitation on the arrangement order of the repeating units —$(CF_2CF_2O)$— and —$(CF_2O)$—.

When x and y in the general formula (1) are in the above ranges, a lubricant which can be easily applied on the protective layer is obtained. Moreover, when the lubricant layer, formed by applying such a lubricant on the protective layer and performing irradiation with ultraviolet rays, can cover the surface of the protective layer to reduce the frictional force between the protective layer and the magnetic head, it is possible to further improve the wear resistance of the protective layer. It is more preferable that x be an integer of 3 to 20, and it is more preferable that y be an integer of 0 to 20.

Examples of the group having an ethylenic carbon-carbon double bond disposed at one or both terminals of the perfluoroalkyl polyether chain of the fluorine-containing ether compound include (meth)acryloyl group, (meth)acryloyloxy group, crotonyl group, allyl group, vinyl group, maleimide group and the like. Among these groups having an ethylenic carbon-carbon double bond, in particular, the (meth)acryloyl group is preferable in terms that a lubricant having excellent ultraviolet curability can be obtained.

In the present specification, "(meth)acryloyl" means acryloyl or methacryloyl.

As the fluorine-containing ether compound, it is preferable that a group having an ethylenic carbon-carbon double bond be disposed at one terminal of a perfluoroalkyl polyether chain and a hydroxyl group be disposed at the other terminal. A lubricant containing such a fluorine-containing ether compound may be used to form a lubricant layer having more excellent adhesion to the protective layer and wear resistance, by applying the solution for forming a lubricant layer on the protective layer and performing irradiation with ultraviolet rays.

When a group having an ethylenic carbon-carbon double bond is disposed at both terminals of a perfluoroalkyl polyether chain, the group having an ethylenic carbon-carbon double bond disposed at both terminals may be the same or different. It is preferable that the groups having ethylenic carbon-carbon double bonds disposed at both terminals be the same, because it is easy to prepare the fluorine-containing ether compound having such groups.

Preferably, in the fluorine-containing ether compound, the perfluoroalkyl polyether chain and the group having an ethylenic carbon-carbon double bond disposed at one or both terminals thereof are bonded via a urethane bond directly, or indirectly through an alkylene group or the like. The lubricant layer obtained by applying such a fluorine-containing ether compound and performing irradiation with ultraviolet rays can suppress the adhesion of the lubricant to the magnetic head (pickup). For example, in a compound obtained by reacting acryloyloxyethyl isocyanate with a perfluoroalkyl polyether having a hydroxyl group at the terminal, the group having an ethylenic carbon-carbon double bond is bonded with the perfluoroalkyl polyether chain via a urethane bond.

Furthermore, in the fluorine-containing ether compound, it is preferable that a group having an ethylenic carbon-carbon double bond be disposed at one terminal of the perfluoroalkyl polyether chain, and a hydroxyl group be disposed at the other terminal; and in addition, the perfluoroalkyl polyether chain and the group having an ethylenic carbon-carbon double bond be bonded via a urethane bond. In this case, when a lubricant layer is obtained by applying the fluorine-containing ether compound and performing irradiation with ultraviolet rays, the urethane bond in one fluorine-containing ether compound and the hydroxyl group disposed at the other terminal of another fluorine-containing ether compound may form a hydrogen bond. As a result, not only the lubricating property of the lubricant layer is improved, but also the adhesion between the lubricant layer and the protective layer is improved, and therefore, the adhesion of the lubricant to the magnetic head (pickup) is effectively suppressed.

When a perfluoroalkyl polyether chain and a group having an ethylenic carbon-carbon double bond disposed at one or both terminals of the perfluoroalkyl polyether chain are bonded via a urethane bond, it is preferable that the group having the ethylenic carbon-carbon double bond and the urethane bond be bonded via a linking group represented by the following general formula (2). It is possible to obtain a lubricant layer having more excellent adhesion to the protective layer by applying such a fluorine-containing ether compound and performing irradiation with ultraviolet rays.

$$—(CH_2CH_2O)_t— \tag{2}$$

In the formula (2), t represents an integer of 1 to 4.

When t in the general formula (2) is in the above range, a lubricant which can be easily applied on the protective layer may be obtained. In addition, when t in the general formula (2) is in the above range, the molecular weight is small, therefore a double bond equivalent (molecular weight/number of double bonds) is reduced. As a result, a lubricant capable of forming a lubricant layer having excellent adhesion to the protective layer can be obtained. It is more preferable that t be 1 or 2.

In the fluorine-containing ether compound, when the perfluoroalkyl polyether chain is the perfluoroalkyl polyether chain represented by the general formula (1), the perfluoroalkyl polyether chain represented by the general formula (1) and the group having an ethylenic carbon-carbon double bond disposed at one or both terminals may be directly bonded via an ether bond (—O—). In this case, it becomes a fluorine-containing ether compound having excellent solubility in the solvent which is used for forming a lubricant layer. As a result, the effect that the concentration of the fluorine-containing ether compound in the solution for forming a lubricant layer can be easily adjusted can be obtained.

The fluorine-containing ether compound contained in the lubricant according to the present embodiment is preferably a compound represented by any one of the general formulas (3) to (7). In the general formulas (3) to (7), x and y are the same as those in the general formula (1).

[Chemical formula 6]

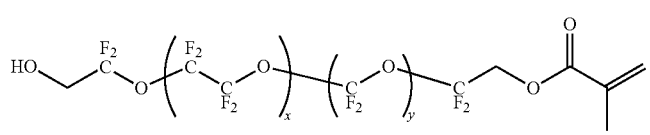

(3)

[Chemical formula 7]

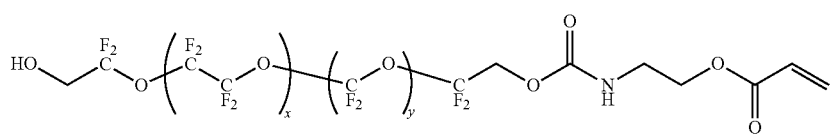

(4)

[Chemical formula 8]

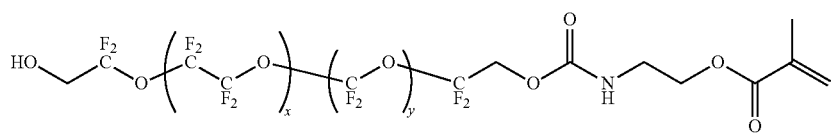

(5)

[Chemical formula 9]

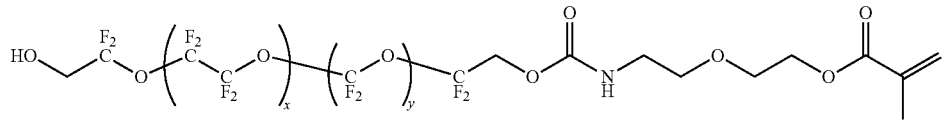

(6)

[Chemical formula 10]

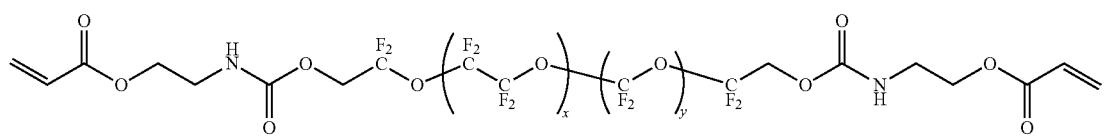

(7)

The fluorine-containing ether compounds represented by the general formulas (3) to (7) have a (meth)acryloyl group as a group having an ethylenic carbon-carbon double bond disposed at one or both terminals of the perfluoroalkyl polyether chain represented by the general formula (1).

The fluorine-containing ether compounds represented by the general formulas (3) to (6) are a compound in which a (meth)acryloyl group as the group having an ethylenic carbon-carbon double bond is disposed at one terminal of the perfluoroalkyl polyether chain represented by the general formula (1), and a hydroxyl group is disposed at the other terminal.

The fluorine-containing ether compound represented by the general formula (7) is a compound in which an acryloyl group as a group having an ethylenic carbon-carbon double bond is disposed at both terminals of the perfluoroalkyl polyether chain represented by the general formula (1).

In the fluorine-containing ether compounds represented by the general formulas (4) to (7), a perfluoroalkyl polyether chain represented by the general formula (1) and a (meth)acryloyl group disposed at one or both terminals thereof are bonded via a urethane bond.

Further, in the fluorine-containing ether compounds represented by the general formulas (4) to (7), the urethane bond and the (meth)acryloyl group as a group having an ethylenic carbon-carbon double bond are bonded via a linking group represented by the above general formula (2).

In the fluorine-containing ether compound represented by the general formula (3), the perfluoroalkyl polyether chain represented by the general formula (1) and a methacryloyl group disposed at one terminal thereof are bonded via an ether bond.

The fluorine-containing ether compound preferably has a number average molecular weight in the range of 500 to 10000, more preferably 500 to 2000. When the number average molecular weight is 500 or more, a lubricant containing the fluorine-containing ether compound is less likely to evaporate. As a result, the lubricant can be prevented from evaporating and being transferred to the magnetic head. When the number average molecular weight is 10000 or less, the viscosity of the fluorine-containing ether compound is appropriate. As a result, it becomes easy to prepare a solution for forming a lubricant layer containing a lubricant containing the fluorine-containing ether compound, and a thin lubricant layer can easily be formed by applying the solution. The number average molecular weight of the fluorine-containing ether compound is more preferably 2000 or less because the viscosity is suitable for handling when preparing a solution for forming a lubricant layer by diluting it with a solvent.

The number average molecular weight of the fluorine-containing ether compound can be determined by gel permeation chromatography (GPC). The measurement conditions of GPC are shown as follows.

Column: manufactured by Shodex, KF803

Eluent: Fluorinated solvent (trade name: ASAHIKLIN AK-225, manufactured by Asahi Glass Co., Ltd.)/Acetone=4/1 (v/v)

Flow rate: 1 mL/min

Detector: ELSD (evaporative light scattering detector)

The fluorine-containing ether compound of the present embodiment can be obtained by reacting two or more kinds of compounds. The synthesis method of the fluorine-containing ether compound of the present embodiment is not particularly limited, and conventionally known synthesis methods may be used to produce it.

(Second Embodiment)

A lubricant according to the present embodiment includes, in addition to the fluorine-containing ether compound, another compound as a lubricant (hereinafter, referred to as "second compound").

"Second Compound"

The second compound is preferably a compound which may improve wear resistance of the protective layer coated with the lubricant layer formed using the lubricant according to the embodiment of the invention. As the second compound, a compound having one or more functional groups at one or both terminals of a perfluoroalkyl polyether chain (hereinafter referred to as second perfluoroalkyl polyether chain) can be used.

The second perfluoroalkyl polyether chain of the second compound is preferably a perfluoroalkyl polyether chain represented by the following general formula (8). In this case, the lubricant layer formed by applying a lubricant on the protective layer and performing irradiation with ultraviolet rays covers the surface of the protective layer and reduces the frictional force between the protective layer and the magnetic head. As a result, a protective layer having better wear resistance may be obtained.

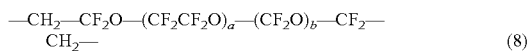

(8)

In the formula (8), a represents an integer of 1 to 30, and b represents an integer of 0 to 30. There is no particular limitation on the arrangement order of the repeating units —$(CF_2CF_2O)$— and —$(CF_2O)$—.

When a and b in the general formula (8) are in the above ranges, a lubricant which can easily be applied on the protective layer is obtained. In addition, a lubricant layer formed by applying the lubricant on the protective layer and performing irradiation with ultraviolet rays has more excellent wear resistance. In the general formula (8), a is more preferably an integer of 3 to 20, and b is more preferably an integer of 3 to 20.

When the lubricant according to this embodiment contains the second compound, the second perfluoroalkyl polyether chain of the second compound and the perfluoroalkyl polyether chain of the above-mentioned fluorine-containing ether compound may be the same, or may be different.

In the second compound, as a functional group disposed at one or both terminals of the second perfluoroalkyl polyether chain, one or more types of functional groups selected from the group consisting of a hydroxyl group, an amino group, an amido group and a carboxyl group can be used. Among them, it is preferable to use a hydroxyl group, which easily forms a hydrogen bond with the protective layer.

Further, in the second compound, the number of the above-mentioned functional groups disposed at one or both terminals of the second perfluoroalkyl polyether chain may be one or two or more, and the number is preferably one. When the number of the functional groups disposed at the terminal of the second compound is one, the number of molecules of the second compound that forms a hydrogen bond with the protective layer can be increased. As a result, it is possible to further improve wear resistance of the lubricant layer.

When one or more functional groups selected from a hydroxyl group, an amino group, an amido group and a carboxyl group are disposed at both terminals of the second perfluoroalkyl polyether chain of the second compound, the functional groups which are disposed at both terminals may be the same or different. It is preferable that the functional groups disposed at both terminals be the same, in terms that the preparation of the second compound is easy.

In the second compound, at least one functional group selected from the group consisting of a hydroxyl group, an amino group, an amide group (RCONH—), and a carboxyl group is disposed at one terminal of the second perfluoroalkyl polyether chain, and other functional groups may be disposed at the other terminal. Examples of other functional groups include phenyl group, p-trifluoromethylphenyl group, p-methoxyphenyl group, naphthyl group, 4-trifluoromethylnaphthyl, 6-trifluoromethylnaphthyl, 4-cyclopentadiene group, phthalimido group, succinimide group, and the like. Among these other functional groups, in particular, since interaction with the protective layer can be expected, phenyl group, p-methoxyphenyl group and p-trifluoromethylphenyl group are preferable.

In the second compound, when the second perfluoroalkyl polyether chain is a perfluoroalkyl polyether chain represented by the general formula (8), the perfluoroalkyl polyether chain represented by the general formula (8) and the functional group disposed at one or both terminals may be bonded via an ether bond. In this case, the functional group can have freedom in rotation and may interact with the protective layer. As a result, the effect of improving the adhesion of the lubricant may be obtained.

The second compound contained in the lubricant according to the present embodiment is preferably a compound represented by the following general formula (9) or (10). In the formulas (9) and (10), a and b are the same as those in the general formula (8).

[Chemical formula 11]

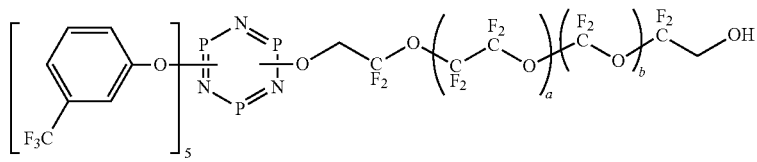

(9)

[Chemical formula 12]

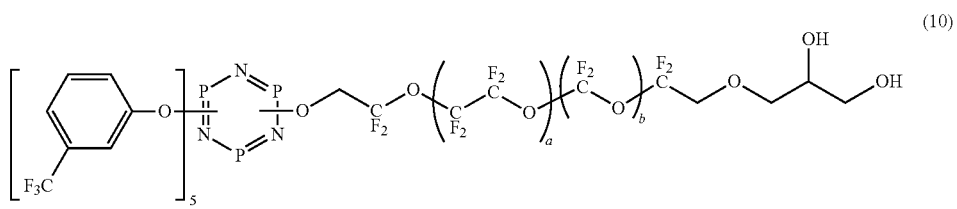

(10)

The number average molecular weight of the second compound is preferably in the range of 500 to 10000, and more preferably 500 to 2000. When the number average molecular weight is 500 or more, a lubricant containing the fluorine-containing ether compound is less likely to evaporate. As a result, the lubricant can be prevented from evaporating and being transferred to the magnetic head. When the number average molecular weight is 10000 or less, the viscosity of the fluorine-containing ether compound is appropriate. As a result, it becomes easy to prepare a solution for forming a lubricant layer containing a lubricant containing the second compound, and a thin lubricant layer can be easily formed by applying the solution. The number average molecular weight is more preferably 2000 or less because the viscosity is suitable for handling when preparing a solution for forming a lubricant layer by diluting it with a solvent.

The number average molecular weight of the second compound can be determined in the same manner as the measurement of the number average molecular weight of the above-mentioned fluorine-containing ether compound.

The method for producing the second compound is not particularly limited, and the second compound can be produced using a conventionally known production method.

"Composition of Lubricant According to the Second Embodiment"

The lubricant according to the embodiment contains the above-mentioned fluorine-containing ether compound and the second compound, and the content of the above-mentioned fluorine-containing ether compound in the lubricant is preferably 30% by mass or more, and more preferably 70% by mass or more.

It is preferable that the lubricant according to this embodiment contains a fluorine-containing ether compound in which a perfluoroalkyl polyether chain and a group having an ethylenic carbon-carbon double bond disposed at one or both terminals thereof are bonded via a urethane bond. It is preferable that the second compound is a compound in which a hydroxyl group is disposed at one or both terminals of the second perfluoroalkyl polyether chain. In this case, in the lubricant layer formed using the lubricant according to the present embodiment, the urethane bond of the fluorine-containing ether compound and the hydroxyl group of the second compound may form a hydrogen bond. As a result, not only the lubricity of the protective layer is improved, but also the adhesion between the lubricant layer and the protective layer is improved, and the adhesion of the lubricant to the magnetic head (pickup) is effectively suppressed.

The lubricant according to the present embodiment may contain, in addition to the above-mentioned fluorine-containing ether compound and the second compound, another compound different from the above-mentioned fluorine-containing ether compound and the second compound, if necessary.

When the lubricant of the present embodiment contains another compound different from the second compound in addition to the above-mentioned fluorine-containing ether compound, a content of the above-mentioned fluorine-containing ether compound (or a content of the total of the fluorine-containing ether compound and the second compound) in the lubricant of the present embodiment is preferably 30% by mass or more, and more preferably 70% by mass or more.

The lubricants according to the first and second embodiments of the present invention are fluorine-containing ether compounds in which a group having an ethylenic carbon-carbon double bond is disposed at one or both terminals of a perfluoroalkyl polyether chain. Therefore, by applying a solution for forming a lubricant layer containing the lubricant on the protective layer and performing irradiation with ultraviolet rays, a lubricant layer for a magnetic recording medium having excellent adhesion to the protective layer can be obtained. In addition, the lubricant layer thus obtained can improve the durability of the magnetic recording medium because the frictional force between the magnetic head and the protective layer is reduced.

[Method of Producing Magnetic Recording Medium]

FIG. 1 is a schematic cross-sectional view showing an embodiment of a magnetic recording medium manufactured by the method of producing a magnetic recording medium of the present invention.

The magnetic recording medium 10 shown in FIG. 1 has a structure in which an adhesion layer 12, a soft magnetic layer 13, a first base layer 14, a second base layer 15, a magnetic layer 16, a protective layer 17, and a lubricant layer 18 are provided in sequence on a substrate 11.

"Substrate"

As the substrate 11, a non-magnetic substrate in which a film made of NiP or a NiP alloy is formed on a base made of a metal or an alloy material such as Al or an Al alloy, can be used.

Further, as the substrate 11, a non-magnetic substrate made of a non-metallic material such as glass, ceramic, silicon, silicon carbide, carbon or resin may be used, and a non-magnetic substrate in which a film made of NiP or a NiP alloy is formed on a base made of such a non-metallic material may also be used.

"Adhesion Layer"

The adhesion layer 12, when disposed so as to contact the substrate 11 and the soft magnetic layer 13 provided on top of the adhesion layer 12, prevents progression of corrosion of the substrate 11.

The material for the adhesion layer 12 may be selected appropriately, for example, from among Cr, Cr alloys, Ti, and Ti alloys, and the like. The adhesion layer 12 can be formed, for example, by a sputtering method.

"Soft Magnetic Layer"

The soft magnetic layer 13 preferably has a structure in which a first soft magnetic film, an intermediate layer formed from a Ru film, and a second soft magnetic film are stacked sequentially. In other words, the soft magnetic layer 13 preferably has a structure in which, by sandwiching an intermediate layer formed from a Ru film between two layers of soft magnetic films, the soft magnetic films above and below the intermediate layer are linked by antiferromagnetic coupling (AFC). When the soft magnetic layer 13 has an AFC coupled structure, the resistance to externally applied magnetic fields, and the durability relative to the WATE (Wide Area Track Erasure) phenomenon, which is a problem peculiar to perpendicular magnetic recording, can both be enhanced.

The first soft magnetic film and the second soft magnetic film are preferably films formed from a CoFe alloy.

When the first soft magnetic film and the second soft magnetic film are films formed from a CoFe alloy, a high saturation magnetic flux density Bs (of at least 1.4 (T)) can be achieved.

Further, any of Zr, Ta and Nb is preferably added to the CoFe alloy used for the first soft magnetic film and the second soft magnetic film. This promotes the amorphization of the first soft magnetic film and the second soft magnetic film, which enables the orientation of the first base layer (seed layer) to be improved, and also enables a reduction in the floating height of the magnetic head.

The soft magnetic layer 13 can be formed, for example, by a sputtering method.

"First Base Layer"

The first base layer 14 is a layer for controlling the orientation and crystal size of the second base layer 15 and the magnetic layer 16 provided on top of the first base layer 14. The first base layer 14 is provided to increase the perpendicular direction component of the magnetic flux generated from the magnetic head wherein the perpendicular direction is the direction perpendicular to the substrate surface, and also to fix the direction of magnetization of the magnetic layer 16 more strongly in a direction perpendicular to the substrate 11.

The first base layer 14 is preferably a layer formed from a NiW alloy. When the first base layer 14 is a layer formed from a NiW alloy, other elements such as B, Mn, Ru, Pt, Mo and Ta may be added to the NiW alloy as necessary.

The first base layer 14 can be formed, for example, by a sputtering method.

"Second Base Layer"

The second base layer 15 is a layer that controls the orientation of the magnetic layer 16 to be more favorable. The second base layer 15 is preferably a layer formed from Ru or a Ru alloy.

The second base layer 15 may be composed of a single layer, or may be composed of a plurality of layers. When the second base layer 15 is composed of a plurality of layers, all of the layers may be formed from the same material, or at least one layer may be formed from a different material.

The second base layer 15 can be formed, for example, by a sputtering method.

"Magnetic Layer"

The magnetic layer 16 is formed from a magnetic film having an easy axis of magnetization that is oriented in either the perpendicular direction or the horizontal direction relative to the substrate surface. The magnetic layer 16 is a layer containing Co and Pt, and may also contain oxides, or Cr, B, Cu, Ta or Zr or the like, in order to improve the SNR characteristics.

Examples of oxides that may be included in the magnetic layer 16 include $SiO_2$, SiO, $Cr_2O_3$, CoO, $Ta_2O_3$ and $TiO_2$.

The magnetic layer 16 may be composed of a single layer, or may be composed of a plurality of magnetic layers formed from materials having different compositions.

For example, in the case where the magnetic layer 16 is composed of three layers, namely a first magnetic layer, a second magnetic layer and a third magnetic layer, the first magnetic layer preferably has a granular structure formed from a material containing Co, Cr and Pt, and also containing an oxide. As the oxide contained in the first magnetic layer, for example, oxides of Cr, Si, Ta, Al, Ti, Mg, Co, and the like, are preferably used. Among these, in particular, oxides such as $TiO_2$, $Cr_2O_3$ and $SiO_2$ can be used favorably. Further, the first magnetic layer is preferably formed from a composite oxide in which two or more types of oxides are added. Among such composite oxides, in particular, $Cr_2O_3$—$SiO_2$, $Cr_2O_3$—$TiO_2$, and $SiO_2$—$TiO_2$ and the like can be used favorably.

The first magnetic layer may also contain, in addition to Co, Cr, Pt and an oxide, one or more elements selected from among B, Ta, Mo, Cu, Nd, W, Nb, Sm, Tb, Ru and Re. By including one or more of the above elements, refinement of the magnetic particles can be promoted, and the crystallinity and orientation can be improved, meaning recording and playback characteristics and thermal fluctuation characteristics suitable for higher density recording can be obtained.

The same materials as those used for the first magnetic layer can be used for the second magnetic layer. The second magnetic layer preferably has a granular structure.

The third magnetic layer preferably has a non-granular structure formed from a material containing Co, Cr and Pt, but containing no oxides. In addition to Co, Cr and Pt, the third magnetic layer may also contain one or more elements selected from among B, Ta, Mo, Cu, Nd, W, Nb, Sm, Tb, Ru, Re and Mn. By including one or more of the above elements in the third magnetic layer in addition to Co, Cr and Pt, refinement of the magnetic particles can be promoted, and the crystallinity and orientation can be improved, meaning recording and playback characteristics and thermal fluctuation characteristics suitable for higher density recording can be obtained.

In those cases where the magnetic layer 16 is composed of a plurality of magnetic layers, a non-magnetic layer is preferably provided between adjacent magnetic layers. When the magnetic layer 16 is composed of three layers, namely a first magnetic layer, a second magnetic layer and a third magnetic layer, a non-magnetic layer is preferably provided between the first magnetic layer and the second magnetic layer, and between the second magnetic layer and the third magnetic layer.

By providing a non-magnetic layer of an appropriate thickness between adjacent magnetic layers, magnetization reversal of each of the layers is easier, and the variance in the magnetization reversal over all the magnetic particles can be reduced, enabling the S/N ratio to be improved.

Examples of materials that can be used favorably for the non-magnetic layers provided between the adjacent magnetic layers of the magnetic layer 16 include Ru, a Ru alloy, a CoCr alloy, and a CoCrX1 alloy (wherein X1 represents one or more elements selected from among Pt, Ta, Zr, Re, Ru, Cu, Nb, Ni, Mn, Ge, Si, O, N, W, Mo, Ti, V, Zr and B) and the like.

An alloy material containing an oxide, a metal nitride or a metal carbide is preferably used for the non-magnetic layers provided between the adjacent magnetic layers of the magnetic layer 16. Specific examples of oxides that may be used include $SiO_2$, $Al_2O_3$, $Ta_2O_5$, $Cr_2O_3$, MgO, $Y_2O_3$, $TiO_2$, and the like. Examples of metal nitrides that may be used include AlN, $Si_3N_4$, TaN, CrN, and the like. Examples of metal carbides that may be used include TaC, BC, SiC, and the like.

The non-magnetic layers may be formed, for example, by a sputtering method.

In order to achieve a higher recording density, the magnetic layer 16 is preferably a magnetic layer for perpendicular magnetic recording, in which the easy axis of magnetization is oriented in a direction perpendicular to the substrate surface, but may be for in-plane magnetic recording.

The magnetic layer 16 may be formed using any conventional method such as a vapor deposition method, ion beam sputtering method or magnetron sputtering method, but is usually formed by a sputtering method.

"Protective Layer"

The protective layer 17 is a layer for protecting the magnetic layer 16. The protective layer 17 may be composed of a single layer, or may be composed of a plurality of layers. The protective layer 17 is preferably a layer made of carbon or silicon carbide. In particular, when the outmost surface of the protective layer 17 is a layer made of carbon containing nitrogen, it is preferable because the bonding strength with the lubricant layer becomes higher and excellent durability can be obtained.

Regarding the method used for forming the protective layer 17, a sputtering method using a target material containing carbon, a CVD (chemical vapor deposition) method using a hydrocarbon raw material such as ethylene or toluene, an IBD (ion beam deposition) method, and the like can be used.

"Lubricant Layer"

The lubricant layer 18 prevents contamination of the magnetic recording medium 10. Further, the lubricant layer 18 also reduces the frictional force of the magnetic head of the magnetic recording and playback device that slides on the magnetic recording medium 10, and improves the durability of the magnetic recording medium 10.

As illustrated in FIG. 1, the lubricant layer 18 is formed so as to contact the protective layer 17. The lubricant layer 18 is formed by applying a solution for forming a lubricant layer containing the lubricant according to the first embodiment or the lubricant according to the second embodiment described above on the protective layer 17, and then performing irradiation with ultraviolet rays.

When the protective layer 17 is made of carbon, the bonding strength between the carbon atoms contained in the protective layer 17 and the lubricant layer 18 is increased, and excellent durability can be obtained.

When the outermost surface of the protective layer 17 disposed under the lubricant layer 18 is a layer made of carbon containing nitrogen, the protective layer 17 has a higher bonding strength with the fluorine-containing ether compound contained in the lubricant layer 18. As a result, contamination of the surface of the magnetic recording medium 10 can be effectively prevented.

The average thickness of the lubricant layer 18 is not particularly limited, and is preferably from 0.5 nm (5 Å) to 3 nm (30 Å), and is more preferably from 0.5 nm (5 Å) to 2 nm (20 Å).

When the average thickness of the lubricant layer 18 is at least 0.5 nm, the lubricant layer 18 is formed with uniform thickness without becoming an island-like or network-like layer. As a result, the surface of the protective layer 17 can be coated with the lubricant layer 18 with a high coverage rate. Further, by ensuring that the average thickness of the lubricant layer 18 is not more than 3 nm, the floating height of the magnetic head can be sufficiently reduced, and the recording density of the magnetic recording medium 10 can be increased.

"Method of Forming Lubricant Layer"

The lubricant layer 18 is formed, for example, by a method including preparing a magnetic recording medium in the middle of production in which each layer up to the protective layer 17 is formed on the substrate 11, applying a solution for forming a lubricant layer on the protective layer 17, and then performing irradiation with ultraviolet rays.

The solution for forming a lubricant layer can be obtained by diluting the lubricant of the above-mentioned embodiment with a solvent as necessary to obtain a viscosity and concentration suitable for the coating method.

The solvent used for the solution for forming a lubricant layer may be any solvent as long as it can dissolve the lubricant. For example, one or more kinds of solvents may be used, and examples of the solvents include alcohol solvents such as 2-propanol, methanol, ethanol and the like; and fluorine solvents such as ASAHIKLIN (registered trademark) AK 225 (Asahi Glass), Vertrel (registered trademark) XF (Mitsui Dupont Fluorochemicals), Novec (registered trademark) HFE 7100 (3M), Novec (registered trademark) HFE 7200 (3M), SOLVE 55 (Solvex) and the like. Among these solvents, it is preferable to use fluorine solvents such as ASAHIKLIN AK 225 (Asahi Glass), Vertrel XF (Mitsui Dupont Fluorochemicals), Novec HFE 7200 (3M) and the like, due to appropriate solubility.

There is no particular limitation on the coating method used for applying the solution for forming the lubricant layer, and examples include spin-coating method and dip method.

When a dip method is used, for example, the method described below may be used. First, the substrate 11 having each layer up to the protective layer 17 is dipped in the solution for forming the lubricant layer, which is put into the dipping tank of a dip coating device. Subsequently, the substrate 11 is pulled up out of the dipping tank at a predetermined speed. In this way, the solution for forming the lubricant layer is applied onto the surface of the protective layer 17 of the substrate 11.

By using the dip method, the solution for forming the lubricant layer can be applied uniformly to the surface of the protective layer 17, enabling the lubricant layer 18 to be formed with uniform thickness on the protective layer 17.

The method of performing irradiation with ultraviolet rays after applying the solution for forming a lubricant layer on the protective layer 17 is not particularly limited as long as a predetermined energy can be obtained, and for example, a method of using a low pressure mercury lamp may be performed.

In addition, after applying the solution for forming a lubricant layer on the protective layer 17, a heat treatment for removing the solvent contained in the solution for forming a lubricant layer may be carried out, if necessary, before performing irradiation with ultraviolet rays.

In this embodiment, by applying a solution for forming a lubricant layer on the protective layer 17 and then performing irradiation with ultraviolet rays, the group having an ethylenic carbon-carbon double bond in the fluorine-containing ether compound contained in the solution for forming a lubricant layer is cleaved, and bonds with the protective layer 17. It is presumed that, in this way, a lubricant layer having excellent adhesion to the protective layer can be obtained.

In order to further improve the adhesion between the lubricant layer and the protective layer, the amount of ultraviolet irradiation energy applied to the solution for forming a lubricant layer coated on the protective layer 17 is a predetermined amount of energy for cleaving the ethylenic carbon-carbon double bond in the fluorine-containing ether compound and bonding the lubricant layer to the protective layer 17. The predetermined amount of energy is preferably in a range in which sufficient adhesion between the lubricant layer and the protective layer can be obtained. It is preferable that the predetermined amount of energy be appropriately determined according to the composition of the solution for forming a lubricant layer, the thickness of the lubricant layer to be formed, and the required adhesion to the protective layer. In particular, it is preferable to confirm in advance the relationship between the various ultraviolet irradiation energy amounts and the adhesion between the lubricant layer to be formed and the protective layer by the following method, to obtain the above-mentioned predetermined energy amount. For example, it is possible to set an amount of ultraviolet irradiation energy to achieve a bonding rate of 65% or more as the predetermined energy amount. The bonding rate used for specifying a predetermined energy amount is not limited to 65% or more. Instead, it can be set appropriately according to the application and the like of the magnetic recording medium.

(Method for Specifying the Predetermined Amount of Energy)

(1) Setting of Immersion Time in Solvent

A lubricant layer is formed on a magnetic recording medium, and a plurality of substrates irradiated with ultraviolet rays with the same energy are prepared. A plurality of ultraviolet-irradiated substrates are immersed in a solvent for various lengths of time, and the range of the immersion time in which the bonding rate shown below is approximately constant is examined. Then, the immersion time of the following experiment (2) is set within the obtained immersion time range. The immersion time is not limited as long as it is within the above-mentioned range, but it is preferable to set the immersion time to about twice the length of time of the shortest time, because the experiment can be performed efficiently if the time is shorter. If the bonding rate does not become constant even after immersing in the solvent for a long time, the energy of the ultraviolet rays irradiated to the substrate is increased and the same experiment is repeated.

"Bonding Rate"

Bonding rate=$(B/A) \times 100$(%)

In the above equation, A is the film thickness of the lubricant layer before performing irradiation with ultraviolet rays, and B is the film thickness of the lubricant layer after being immersed in a solvent.

(2) Specifying the Predetermined Amount of Energy

A lubricant layer is formed on a magnetic recording medium, and substrates irradiated with ultraviolet rays with various energy are prepared. The substrate subjected to ultraviolet irradiation is immersed in the solvent for the immersion time set in (1), and the ultraviolet irradiation energy at which the bonding rate is 65% or more is specified as the predetermined energy amount (J/magnetic recording medium).

The magnetic recording medium 10 of the present embodiment is a magnetic recording medium in which at least the magnetic layer 16, the protective layer 17, and the lubricant layer 18 are sequentially provided on the substrate 11. In the magnetic recording medium 10 of the present embodiment, after applying the solution for forming a lubricant layer containing the lubricant of the present embodiment on the protective layer 17, the lubricant layer 18 is formed by performing irradiation with ultraviolet rays. The lubricant layer 18 has excellent adhesion to the protective layer 17 and it is possible to reduce the friction force between the magnetic head and the protective layer 18. Thus, the magnetic recording medium 10 is excellent in durability.

EXAMPLE

Hereinafter, the present invention will be more specifically described by way of examples and comparative examples, but the present invention is not limited to only the following examples.

Synthesis Example 1

The fluorine-containing ether compound represented by the general formula (3) was synthesized by the method shown below.

Under a nitrogen gas atmosphere, 7 g (3.5 mmol) of a fluoropolyether (Fomblin (registered trademark) ZDOL 2000 S manufactured by Solvay Solexis, number average molecular weight 2000, molecular weight distribution 1.1) represented by the following general formula (11) was added in a 50 mL eggplant flask, and 14 mL of dichloromethane and 21 mL of 1, 1, 1, 3, 3-pentafluorobutane (SOLVE 55 manufactured by Solvex) as solvents were added, and the mixture was stirred until it became uniform.

[Chemical formula 13]

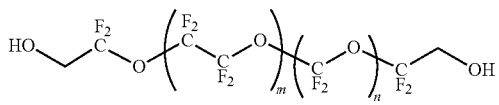

(11)

In the formula (11), m represents 1 to 30, and n represents 0 to 30. There is no particular limitation on the arrangement order of the repeating units —(CF$_2$CF$_2$O)— and —(CF$_2$O)—.

350 mg (3.5 mmol) of triethylamine (manufactured by Tokyo Chemical Industry Co., Ltd.) and 460 mg (4.4 mmol) of methyl methacryloyl chloride (manufactured by Tokyo Chemical Industry Co., Ltd.) were added, and stirred at room temperature for 6 hours for reaction. And then, the reaction product was separated and washed with pure water, and the solvent was distilled off.

Subsequently, impurities contained in the reaction product were removed by the following method. 10 mL of n-hexane was added to the eggplant flask containing the reaction product, and the reaction product was stirred and washed and allowed to stand. The operation of removing the n-hexane phase by decantation was repeated three times to remove the reaction residue in the reaction product. And then n-hexane was distilled off under reduced pressure, and as a result, about 7 g of Compound a represented by the general formula (3) was obtained.

The $^1$H-NMR and $^{19}$F-NMR measurements of the resulting Compound a were performed, and the structure was identified from the following results.

$^1$H-NMR (acetone-D$_6$): δ[ppm]=1.87(3H), 3.80 to 4.00 (2H), 4.42 to 4.60(2H), 4.78 to 5.01(1H), 5.60 to 5.70 (1H), 5.95 to 6.03(1H)

$^{19}$F-NMR (acetone-D$_6$): δ[ppm]=−91.02 to −88.48(42F), −83.38 to −81.30(2F), −80.63 to −78.65(2F), −55.67 to −51.35(20F)

Synthesis Example 2

The fluorine-containing ether compound represented by the general formula (4) was synthesized by the method shown below.

The same amount of the same fluoropolyether as in Synthesis Example 1 and the same solvent as in Synthesis Example 1 were charged into a 50 mL eggplant flask under a nitrogen gas atmosphere, and the mixture was stirred until it became uniform.

0.02 g of dibutyltin dilaurate was added, and 530 mg (3.76 mmol) of 2-acryloyloxyethyl isocyanate (Karenz AOI (registered trademark) manufactured by Showa Denko K. K.) was dropped as a urethane forming agent at room temperature, and disappearance of the isocyanate group-derived peak (2300 cm$^{-1}$) was confirmed by an FT-IR analysis (Fourier transform infrared spectroscopy) method. And then the solvent was distilled off under reduced pressure.

Subsequently, the impurities were removed in the same manner as in Synthesis Example 1 to obtain about 7 g of Compound b represented by the general formula (4).

The $^1$H-NMR and $^{19}$F-NMR measurements of the resulting Compound b were conducted, and the structure was identified from the following results.

$^1$H-NMR (acetone-D$_6$): δ[ppm]=3.40 to 3.55(2H), 3.80 to 4.00(2H), 4.14 to 4.30(2H), 4.42 to 4.60(2H), 4.80 to 5.00(1H), 5.80 to 5.92(1H), 6.00 to 6.18(1H), 6.28 to 6.42(1H), 6.55 to 6.73(1H)

$^{19}$F-NMR (acetone-D$_6$): δ[ppm]=−91.00 to −88.49(42F), −83.39 to −81.32(2F), −80.62 to −78.62(2F), −55.65 to −51.37(20F)

Synthesis Example 3

The fluorine-containing ether compound represented by the general formula (5) was synthesized by the method shown below.

About 7 g of Compound c represented by the general formula (5) was obtained in the same manner as in Synthesis Example 2 except that 586 mg of 2-methacryloyloxyethyl isocyanate (Karenz MOI (registered trademark) manufactured by Showa Denko K. K.) was used as a urethane forming agent.

The $^1$H-NMR and $^{19}$F-NMR measurements of the resulting Compound c were conducted, and the structure was identified from the following results.

$^1$H-NMR (acetone-D$_6$): δ[ppm]=1.85(3H), 3.46 to 3.55 (2H), 3.78 to 4.00(2H), 4.15 to 4.52(4H), 4.80 to 5.03(1H), 5.60 to 5.70(1H), 5.95 to 6.03(1H), 6.60 to 6.78(1H)

$^{19}$F-NMR (acetone-D$_6$): δ[ppm]=−91.00 to −88.50(42F), −83.40 to −81.30(2F), −80.60 to −78.60(2F), −55.65 to −51.35(20F)

Synthesis Example 4

The fluorine-containing ether compound represented by the general formula (6) was synthesized by the method shown below.

About 7 g of Compound d represented by the general formula (6) was obtained in the same manner as in Synthesis Example 2 except that 540 mg of 2-methacryloyloxyethyl oxyethyl isocyanate (Karenz MOI-EG (registered trademark) manufactured by Showa Denko K. K.) was used as the urethane forming agent.

The $^1$H-NMR and $^{19}$F-NMR measurements of the resulting Compound d were performed, and the structure was identified from the following results.

$^1$H-NMR (acetone-D$_6$): δ[ppm]=1.83(3H), 3.46 to 3.55 (2H), 3.55 to 4.40(8H), 4.42 to 4.52(2H), 4.80 to 5.00(1H), 5.60 to 5.70(1H), 5.95 to 6.05(1H), 6.60 to 6.75(1H)

$^{19}$F-NMR (acetone-D$_6$): δ[ppm]=−91.00 to −88.50(42F), −83.40 to −81.30(2F), −80.60 to −78.60(2F), −55.65 to −51.35(20F)

Synthesis Example 5

The fluorine-containing ether compound represented by the general formula (7) was synthesized by the method shown below.

About 7 g of Compound e represented by the general formula (7) was obtained in the same manner as in Synthesis Example 2 except that the amount of the urethane forming agent used was changed to 1.06 g.

The $^1$H-NMR and $^{19}$F-NMR measurements of the resulting Compound e were conducted, and the structure was identified from the following results.

$^1$H-NMR (acetone-D$_6$): δ[ppm]=3.40 to 3.55(4H), 4.14 to 4.30(4H), 4.42 to 4.60(4H), 5.80 to 5.92(2H), 6.00 to 6.18(2H), 6.28 to 6.42(2H), 6.55 to 6.73(2H)

$^{19}$F-NMR (acetone-D$_6$): δ[ppm]=−91.00 to −88.49(42F), −80.62 to −78.62(4F), −55.65 to −51.37(20F)

Comparative Synthesis Example 1

The fluoropolyether represented by the general formula (11) used in the synthesis of the Compounds a to e of the synthesis examples 1 to 5 was referred to as Compound f.

Comparative Synthesis Example 2

The fluorine-containing ether compound (Compound g) represented by the following general formula (12) was synthesized by the method shown below.

About 7 g of Compound g represented by the general formula (12) was obtained in the same manner as in Synthesis Example 2 except that 300 mg of ethyl isocyanate (manufactured by Tokyo Chemical Industry Co., Ltd.) was used as the urethane forming agent.

[Chemical formula 14]

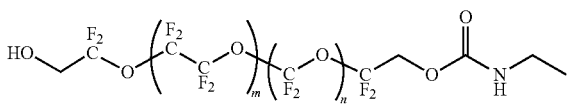

(12)

In the formula (12), m and n are the same as in the general formula (11).

The $^1$H-NMR and $^{19}$F-NMR measurements of the resulting Compound g were conducted, and the structure was identified from the following results.

$^1$H-NMR (acetone-D$_6$): δ[ppm]=1.32(3H), 3.60(2H), 3.78 to 4.00(2H), 4.47 to 4.57(2H)

$^{19}$F-NMR (acetone-D$_6$): δ[ppm]=−91.00 to −88.50 (42F), −83.40 to −81.30(2F), −80.60 to −78.60 (2F), −55.65 to −51.35 (20F)

Examples 1 to 5, Comparative Examples 1 and 2

(Production of Magnetic Recording Media)

Solutions for forming a lubricant layer containing Compounds a to g of Synthesis Examples 1 to 5 and Comparative Synthesis Examples 1 and 2 as a lubricant were prepared by the method described below. The solutions were used to form lubricant layers on the protective layers of the magnetic recording media, and the magnetic recording media of Examples 1 to 5 and Comparative Examples 1 and 2 were obtained.

First, a magnetic recording medium was prepared in which an adhesion layer, a soft magnetic layer, a first base layer, a second base layer, a magnetic layer and a protective layer were sequentially provided on a substrate having a diameter of 65 mm. The protective layer in which the outermost surface was made of carbon containing nitrogen was used.

Further, each of Compounds a to g was dissolved in Vertrel (registered trademark) XF (trade name, manufactured by Mitsui DuPont Fluorochemicals), which is a fluorine-based solvent, and the solution was diluted with Vertrel XF to form a solution for forming a lubricant layer so that the film thickness would be 10 Å to 15 Å when the solution was coated on the protective layer.

Next, the solution for forming a lubricant layer was applied by dip method on the protective layer of the magnetic recording medium in which each layer up to the protective layer was formed. The dip method was carried out under the conditions of an immersion speed of 10 mm/sec, an immersion time of 30 sec, and a pulling speed of 1.2 mm/sec.

Thereafter, the magnetic recording medium coated with the solution for forming a lubricant layer was placed in a thermostatic chamber at 120° C. and heated for 10 minutes to remove the solvent in the solution for forming a lubricant layer, and as a result, a lubricant layer was formed on the protective layer.

The film thickness of the lubricant layer thus formed was measured using FT-IR (trade name: Nicolet iS 50, manufactured by Thermo Fisher Scientific). The results are shown in Table 1.

Next, the lubricant layer formed on the magnetic recording medium was irradiated with ultraviolet rays, which was performed using a low pressure mercury lamp SUV-110S (manufactured by Sen Lights Corporation). In Example 1, the ultraviolet rays were irradiated so that the amount of ultraviolet irradiation energy per magnetic recording medium was the predetermined amount of energy (10 J) determined by the above-mentioned (Method for Specifying the Predetermined Amount of Energy). In Examples 2 to 5 and Comparative Examples 1 and 2, the ultraviolet rays were irradiated so that the ultraviolet irradiation energy per magnetic recording medium was the predetermined energy amount (10 J) of Example 1.

The magnetic recording media of Examples 1 to 5 and Comparative Examples 1 and 2 in which the lubricant layer irradiated with ultraviolet rays was formed on the protective layer were obtained by the above steps.

Next, regarding the magnetic recording media of Examples 1 to 5 and Comparative Examples 1 and 2, the adhesion between the lubricant layer irradiated with ultraviolet rays and the protective layer was evaluated by the following method.

(Adhesion Test Between the Lubricant Layer Irradiated with Ultraviolet Rays and Protective Layer)

The magnetic recording medium on which the lubricant layer irradiated with ultraviolet rays was formed was washed by the method shown below, and the film thickness of the washed lubricant layer was measured in the same manner as in the measurement of the film thickness of the lubricant layer performed before the ultraviolet irradiation.

Washing the magnetic recording medium was carried out by immersing the magnetic recording medium having the lubricant layer in a solvent not containing a lubricant for 10 minutes and then pulling it up. It was performed under the conditions of an immersion speed of 10 mm/sec and a pulling speed of 1.2 mm/sec.

A plurality of magnetic recording media having a lubricant layer irradiated with ultraviolet rays were prepared, and the magnetic recording media were washed by two kinds of washing methods, including washing using Vertrel and washing using ethanol as the solvent.

Then, when the film thickness of the lubricant layer before ultraviolet irradiation was set as A, and the film thickness of the lubricant layer after washing (after immersing into a solvent) was set as B, the bonding rate of the lubricant was calculated from a ratio of B to A ((B/A)×100(%)), and the lubricant layer was evaluated according to the following criteria. The results are shown in Table 1.

In Table 1, "VBR (Vertrel Bonded Ratio)" is an evaluation result in the case of washing with Vertrel, and "EBR (Ethanol Bonded Ratio)" is an evaluation result in the case of washing with ethanol.

(Criteria)
⊚: Bonding rate is 65% or more.
○: Bonding rate is 30% or more and less than 65%.
x: Bonding rate is less than 30%.

TABLE 1

|  | Compound | Film thickness (Å) | VBR | EBR |
|---|---|---|---|---|
| Example 1 | a | 10 | ⊚ | ○ |
| Example 2 | b | 10 | ⊚ | ○ |
| Example 3 | c | 10 | ⊚ | ○ |
| Example 4 | d | 11 | ⊚ | ○ |
| Example 5 | e | 11 | ⊚ | ○ |
| Comparative example 1 | f | 10 | ○ | X |
| Comparative example 2 | g | 10 | X | X |

As shown in Table 1, the evaluations of the lubricant layers of Examples 1 to 5 formed using the solution for forming a lubricant layer containing the Compounds a to e of Synthesis Examples 1 to 5 as a lubricant were ⊚ in the case of washing with Vertrel, and were ○ in the case of washing with ethanol. It was found that the adhesion to the protective layer was excellent.

On the other hand, the evaluation of the lubricant layer of Comparative Example 1, which was formed using the solution for forming a lubricant layer containing Compound f of Comparative Synthesis Example 1 as a lubricant, was ○ in the case of washing with Vertrel, but it was x in the case of washing with ethanol. The adhesion to the protective layer was insufficient.

The evaluations of the lubricant layer of Comparative Example 2, which was formed using the solution for forming a lubricant layer containing Compound g of Comparative Synthesis Example 2 as a lubricant were x in both cases of washing with Vertrel and washing with ethanol. The adhesion to the protective layer was insufficient.

Next, with respect to the magnetic recording media of Example 1 and Example 2, the adhesion between the lubricant layer not irradiated with ultraviolet rays and the protective layer was evaluated by the following method.

(Adhesion Test of Protective Layer and Lubricant Layer without Irradiation with Ultraviolet Rays)

The magnetic recording medium on which the lubricant layer before the irradiation of ultraviolet rays was formed was washed in the same manner as the adhesion test between the lubricant layer irradiated with ultraviolet rays and the protective layer described above. Then, the film thickness of the lubricant layer after washing was measured by the same method as the measurement of the film thickness of the lubricant layer performed before ultraviolet irradiation. And then the bonding rate of the lubricant was calculated, and the following criteria was used to carry out evaluation. The results are shown in Table 2.

In Table 2, "VBR" is an evaluation result in the case of washing with Vertrel, and "EBR" is an evaluation result in the case of washing with ethanol.

(Criteria)
⊚: Bonding rate is 65% or more.
○: Bonding rate is 30% or more and less than 65%.
x: Bonding rate is less than 30%.

TABLE 2

|  | Compound | Film thickness (Å) | VBR | EBR |
|---|---|---|---|---|
| Example 1 | a | 10 | ○ | X |
| Example 2 | b | 10 | ○ | X |

As shown in Tables 1 and 2, regarding the lubricant layer of Example 1 and the lubricant layer of Example 2, it was found that the adhesion between the lubricant layer and the protective layer was improved by the irradiation of ultraviolet rays. The lubricant layer of Example 1 was obtained by using the solution for forming a lubricant layer containing Compound a of Synthesis Example 1 as a lubricant; and the lubricant layer of Example 2 was obtained by using the solution for forming a lubricant layer containing Compound b of Synthesis Example 2 as a lubricant.

Example 6 to Example 15, Comparative Example 3 to Comparative Example 6

The magnetic recording media of Examples 6 to 15 and Comparative Examples 3 to 6, in which a lubricant layer was formed on the protective layer by performing irradiation with ultraviolet rays, were obtained in the same manner as the magnetic recording medium of Example 1 above, except that the solution for forming a lubricant layer, containing Compounds a to g of Synthesis Examples 1 to 5 and Comparative Synthesis Examples 1 and 2 and the second compound shown below, wherein the content of the second compound in the lubricant is 30% by mass, was used.

As the second compound, Compound h represented by General Formula (9) (MORESCO PHOSFAROL A20H manufactured by MORESCO) or Compound i represented by General Formula (10) (MORESCO PHOSFAROL ADOH manufactured by MORESCO) was used.

Example 16

The magnetic recording medium of Example 16, in which a lubricant layer was formed on the protective layer by performing irradiation with ultraviolet rays, was obtained in the same manner as the magnetic recording medium of Example 1 above, except that the solution for forming a lubricant layer containing Compound b was used as a lubricant.

Comparative Example 7

The magnetic recording medium of Comparative Example 7, in which a lubricant layer was formed on the protective layer by performing irradiation with ultraviolet rays, was obtained in the same manner as the magnetic recording medium of Example 1 above, except that the solution for forming a lubricant layer containing Compound f was used as a lubricant.

Using the magnetic recording media of Examples 6 to 16 and Comparative Examples 3 to 7 obtained as described above, the pickup suppressing effect and the wear resistance were examined by the methods shown below. The results are shown in Table 4.

Further, when producing the magnetic recording media of Examples 6 to 16 and Comparative Examples 3 to 7, the film thickness of the lubricant layer before ultraviolet irradiation was measured using the same method as that of Example 1. The results are shown in Table 4.

(Pickup Suppression Test)

The magnetic recording medium and a magnetic head were mounted on a spin stand, and the magnetic head was floated at a fixed point for 10 minutes under normal temperature and reduced pressure conditions (about 250 torr). Subsequently, the surface of the magnetic head facing the magnetic recording medium was analyzed using an Electron Spectroscopy for Chemical Analysis (ESCA) analyzer. Based on the intensity of the fluorine-derived peak (signal intensity), the amount of the lubricant adhered to the magnetic head was evaluated by the criteria shown in Table 3. The results are shown in Table 4.

TABLE 3

| ESCA signal intensity (a. u.) | |
|---|---|
| ◎ 500 or less | No lubricant adhered to the head and there is no change in the signal intensity. |
| ○ more than 500 to 1000 | A slight amount of lubricant adhered to the head, but the signal intensity is small. |
| Δ more than 1000 to 2000 | A small amount of lubricant adhered to the head, and the signal intensity is about medium. |

TABLE 3-continued

| ESCA signal intensity (a. u.) | |
|---|---|
| X more than 2000 | A large amount of lubricant adhered to the head, and the signal intensity is large. |

(Wear Resistance Test)

Using a pin-on-disk type friction and wear tester, an alumina ball having a diameter of 2 mm was used as a contact and was slid with a load of 40 gf at a sliding speed of 0.25 m/sec, to measure a coefficient of friction of the surface of the lubricant layer, and the time until the coefficient of friction sharply increases was measured. The time until the coefficient of friction sharply increases was measured four times for each lubricant layer of the Examples and Comparative Examples, and an average value (time) thereof was used as an indicator of the wear resistance of the lubricant coating film.

The time until the coefficient of friction sharply increases can be used as an indicator of the wear resistance of the lubricant layer for the following reason. In the lubricant layer of the magnetic recording medium, wear progresses according to use of the magnetic recording medium. When the lubricant layer disappears due to the wear, the contact and the protective layer are in direct contact with each other to cause the coefficient of friction to sharply increase.

TABLE 4

| | Compound | The second compound | Film thickness (Å) | Pick-up | Wear resistance* (sec) |
|---|---|---|---|---|---|
| Example 6 | a | h | 12 | ○ | 490 |
| Example 7 | a | i | 12 | ○ | 520 |
| Example 8 | b | h | 11 | ◎ | 830 |
| Example 9 | b | i | 12 | ◎ | 890 |
| Example 10 | c | h | 10 | ◎ | 780 |
| Example 11 | c | i | 11 | ◎ | 850 |
| Example 12 | d | h | 11 | ◎ | 790 |
| Example 13 | d | i | 12 | ◎ | 870 |
| Example 14 | e | h | 11 | ◎ | 500 |
| Example 15 | e | i | 10 | ◎ | 565 |
| Example 16 | b | — | 11 | ○ | 450 |
| Comparative example 3 | f | h | 11 | X | 300 |
| Comparative example 4 | f | i | 12 | X | 380 |
| Comparative example 5 | g | h | 10 | Δ | 320 |
| Comparative example 6 | g | i | 11 | X | 360 |
| Comparative example 7 | f | — | 11 | X | 200 |

*Time until the coefficient of friction increases

As shown in Table 4, it was found that the lubricant layers of Examples 6 to 16 formed using the solution for forming a lubricant layer containing Compounds a to e as a lubricant have effects that the time until the coefficient of friction sharply increases was long and the wear resistance was excellent, as compared with the lubricant layers of Comparative Examples 3 to 7 formed using a solution for forming a lubricant layer containing Compounds f and g as a lubricant. In particular, it was found that the lubricant layers of Examples 8 to 13 formed using the lubricant layer forming solution containing Compounds b to d having a urethane bond and a second compound as a lubricant, wherein Compounds b to d have a (meth)acryloyl group at one terminal of a perfluoroalkyl polyether chain and a hydroxyl group at the other terminal, have effects that the time until the coefficient of friction sharply increases was long and the wear resistance was excellent.

In addition, regarding the lubricant layers of Examples 6 to 16, the amount of the lubricant that adhered to the magnetic head was small, and an excellent pickup suppressing effect was observed as compared with the lubricant layers of Comparative Examples 3 to 7.

In particular, it was found that the lubricant layers of Examples 8 to 15, which were formed using a solution for forming a lubricant layer containing Compounds b to e having a urethane bond and the second compound as a lubricant, had an excellent pickup suppressing effect.

Moreover, in Example 8 and Example 9 containing Compound b and the second compound, it was found that excellent wear resistance and excellent pickup suppression were obtained, as compared with Example 16 which contains the Compound b and does not contain the second compound.

DESCRIPTION/EXPLANATION OF REFERENCES

10: Magnetic recording medium
11: Substrate
12: Adhesion layer
13: Soft magnetic layer
14: First base layer
15: Second base layer
16: Magnetic layer
17: Protective layer
18: Lubricant layer

What is claimed is:

1. A lubricant for a magnetic recording medium, comprising a fluorine-containing ether compound in which a group having an ethylenic carbon-carbon double bond is disposed at one terminal of a perfluoroalkyl polyether chain, and a hydroxyl group is disposed at the other terminal.

2. The lubricant for a magnetic recording medium according to claim 1, wherein the group having an ethylenic carbon-carbon double bond is a (meth)acryloyl group.

3. The lubricant for a magnetic recording medium according to claim 1, wherein the group having an ethylenic carbon-carbon double bond is a (meth)acryloyloxy group.

4. The lubricant for a magnetic recording medium according to claim 1, wherein the lubricant is represented by the following formula (3):

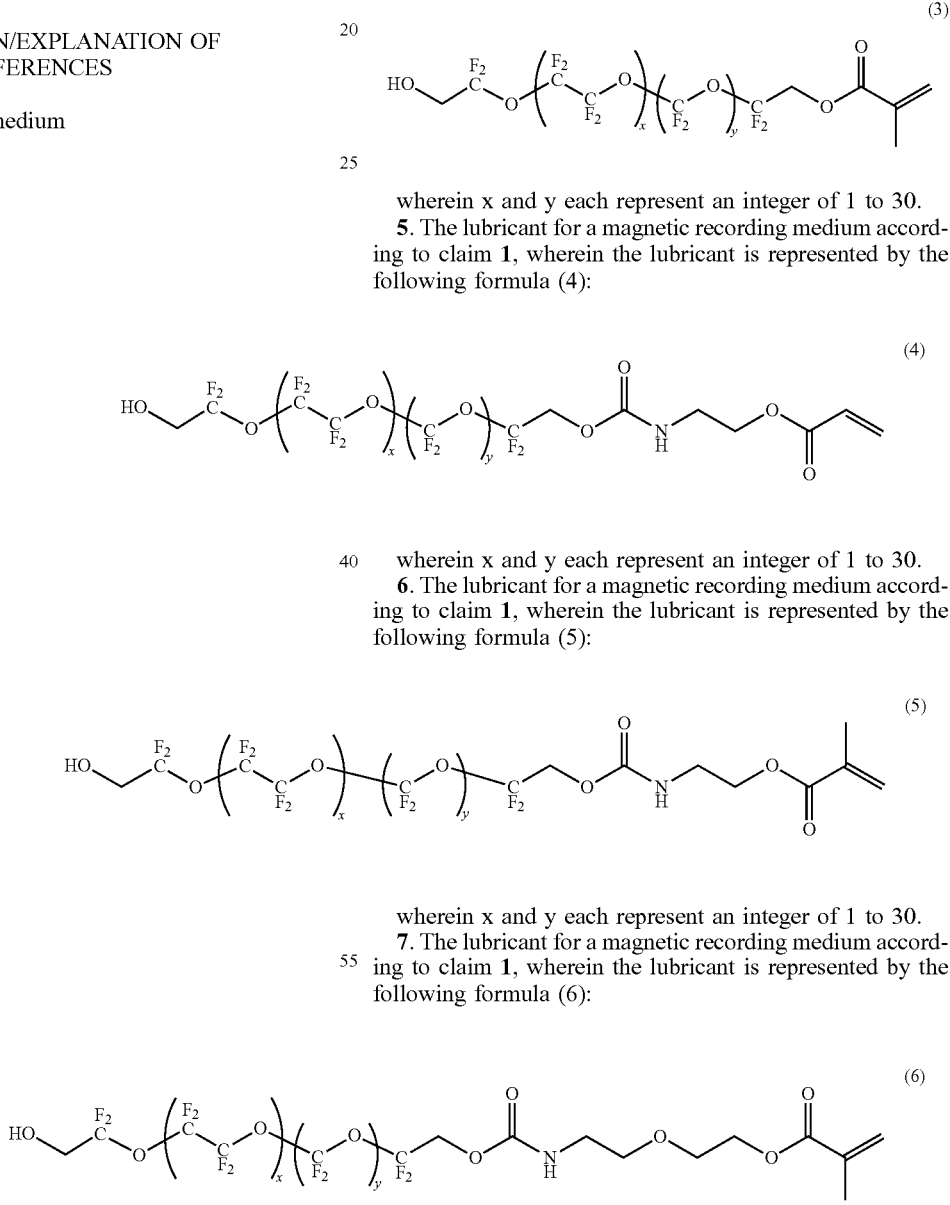

wherein x and y each represent an integer of 1 to 30.

5. The lubricant for a magnetic recording medium according to claim 1, wherein the lubricant is represented by the following formula (4):

wherein x and y each represent an integer of 1 to 30.

6. The lubricant for a magnetic recording medium according to claim 1, wherein the lubricant is represented by the following formula (5):

wherein x and y each represent an integer of 1 to 30.

7. The lubricant for a magnetic recording medium according to claim 1, wherein the lubricant is represented by the following formula (6):

wherein x and y each represent an integer of 1 to 30.

8. The lubricant for a magnetic recording medium according to claim 1, wherein, in the fluorine-containing ether compound, the perfluoroalkyl polyether chain and the group having an ethylenic carbon-carbon double bond are bonded via a urethane bond.

9. A method of producing a magnetic recording medium, comprising:
- a lubricant layer forming step of forming a lubricant layer on a protective layer,
- wherein the lubricant layer forming step comprises
- applying a solution for forming a lubricant layer on the protective layer wherein the solution contains the lubricant for a magnetic recording medium according to claim 1, and then
- performing irradiation with ultraviolet rays.

10. A lubricant for a magnetic recording medium, comprising:
- a fluorine-containing ether compound in which a group having an ethylenic carbon-carbon double bond is disposed at one or both terminals of a perfluoroalkyl polyether chain, and
- a second compound in which one or more functional groups which are one or more types selected from the group consisting of a hydroxyl group, an amino group, an amido group and a carboxyl group are disposed at one or both terminals of a second perfluoroalkyl polyether chain.

11. A method of producing a magnetic recording medium, comprising:
- a lubricant layer forming step of forming a lubricant layer on a protective layer,
- wherein the lubricant layer forming step comprises
- applying a solution for forming a lubricant layer on the protective layer wherein the solution contains the lubricant for a magnetic recording medium according to claim 10, and then
- performing irradiation with ultraviolet rays.

* * * * *